US009449116B2

(12) United States Patent
Tsirkin

(10) Patent No.: US 9,449,116 B2
(45) Date of Patent: Sep. 20, 2016

(54) ONLINE RADIX TREE COMPRESSION WITH KEY SEQUENCE SKIP

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 188 days.

(21) Appl. No.: 14/194,539

(22) Filed: Feb. 28, 2014

(65) Prior Publication Data

US 2015/0248448 A1 Sep. 3, 2015

(51) Int. Cl.
*G06F 17/30* (2006.01)

(52) U.S. Cl.
CPC .................. *G06F 17/30961* (2013.01)

(58) Field of Classification Search
CPC ................. G06F 17/30327; G06F 17/30345
USPC .......................................... 707/741
See application file for complete search history.

(56) References Cited

U.S. PATENT DOCUMENTS 6,694,323 B2 * 2/2004 Bumbulis ......... G06F 17/30327

OTHER PUBLICATIONS

Radix Tree, Wikipedia, the free encyclopedia, retrieved on Apr. 24, 2014 from http://en.wikipedia.org/wiki/Radix_tree, pp. 1-7.
Trees I: Radix Trees, [LWN.net], retrieved on Apr. 24, 2014 from http://lwn.net/Articles/175432/, pp. 1-3, Copyright © 2006, Eklektix, Inc.

* cited by examiner

*Primary Examiner* — Alford Kindred
*Assistant Examiner* — Tracy McGhee
(74) *Attorney, Agent, or Firm* — Haynes and Boone, LLP

(57) ABSTRACT

Systems and methods are disclosed for inserting a key into and removing a key from a composite data structure including a radix tree and an auxiliary data structure. In an example, a method of inserting a key into the composite data structure includes receiving an instruction to store a first key in the composite data structure. The composite data structure stores a second key. The method further includes generating, based on comparing the first and second keys, one or more sequences of elements. The method also includes splitting each of the generated sequences of elements into a prefix and a suffix, storing the respective prefixes into the radix tree; and storing the respective suffixes into the auxiliary data structure.

33 Claims, 10 Drawing Sheets

ONLINE RADIX TREE COMPRESSION WITH KEY SEQUENCE SKIP

BACKGROUND

The present disclosure generally relates to a radix tree, and more particularly to maintaining a compressed radix tree.

A radix tree is a data structure that is used to store data. A radix tree may be useful for constructing associative arrays with keys that can be expressed as strings. In a conventional radix tree, the string at each node is compared chunk by chunk, where the quantity of bits in that chunk at that node is the radix r of the radix tree. A radix tree typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix. To determine whether a radix tree stores a particular key, performing a search operation on the radix tree may take a long time. It may be desirable to store keys in a radix tree such that the lookup time may be reduced.

BRIEF SUMMARY

The disclosure relates to maintaining a composite data structure including a radix tree and an auxiliary data structure. Methods, systems, and techniques for inserting a key into the composite data structure are provided According to an embodiment, a method of inserting a key into a composite data structure includes receiving an instruction to store a first key into a composite data structure including a radix tree and an auxiliary data structure. The first key includes a first sequence of elements, and the composite data structure stores a second key including a second sequence of elements. The method also includes comparing the first and second keys. The method further includes generating, based on the comparison, one or more sequences of elements. In an example, generating the one or more sequences of elements includes generating a common prefix chunk that is in the first and second keys and generating one or more remainder sequences. The method also includes storing the first key into the composite data structure. In an example, storing the first key into the composite data structure includes for each generated sequence of elements, splitting the respective generated sequence of elements into a prefix and a suffix, storing the respective prefix into the radix tree, and storing the respective suffix into the auxiliary data structure.

According to another embodiment, a system for inserting a key into a composite data structure including a radix tree and an auxiliary data structure includes a key inserter that receives an instruction to store a first key into a composite data structure including a radix tree and an auxiliary data structure. The first key includes a first sequence of elements, and the composite data structure stores a second key including a second sequence of elements. The system also includes a sequence generator that compares the first and second keys. The sequence generator generates, based on the comparison, one or more sequences of elements. In an example, the sequence generator generates a common prefix chunk that is in the first and second keys and generates one or more remainder sequences. The system further includes a splitter that splits each generated sequence of elements into a prefix and a suffix. The system also includes a radix tree builder that stores the one or more prefixes into the radix tree. The system further includes a data structure builder that stores the one or more suffixes into the auxiliary data structure.

According to another embodiment, a non-transitory machine-readable medium includes a plurality of machine-readable instructions that when executed by one or more processors are adapted to cause the one or more processors to perform a method including receiving an instruction to store a first key into a composite data structure including a radix tree and an auxiliary data structure, the first key including a first sequence of elements, and the composite data structure storing a second key including a second sequence of elements; comparing the first and second keys; generating, based on the comparing the first and second keys, one or more sequences of elements, where generating the one or more sequences of elements includes generating a common prefix chunk that is in the first and second keys and generating one or more remainder sequences; and storing the first key into the composite data structure, where storing the first key includes for each generated sequence of elements: splitting the respective generated sequence of elements into a prefix and a suffix, storing the respective prefix into the radix tree, and storing the respective suffix into the auxiliary data structure.

Methods, systems, and techniques for removing a key from the composite data structure are provided. According to an embodiment, a method of removing a key from a composite data structure including a radix tree and an auxiliary data structure includes receiving an instruction to remove a key from a composite data structure including a radix tree and an auxiliary data structure. The key includes a sequence of elements, the radix tree includes one or more containers storing a prefix, and the auxiliary data structure includes one or more entries storing a suffix. The method also includes traversing the composite data structure to identify a set of containers and a set of entries storing chunks of the key. A traversal of the set of containers and the set of entries identifies the key. The method further includes identifying a leaf storing the last chunk of elements in the key. The method also includes removing the leaf. The method further includes determining whether a parent container of the leaf has only one child after the leaf is removed. The method also includes when the parent container of the leaf is determined to have only one child after the leaf is removed, combining one or more sequences of elements based on the traversal of the set of containers and the set of entries. The method further includes storing the combined one or more sequences of elements in an entry in the auxiliary data structure. The method also includes storing a reference from the parent container to the entry.

According to another embodiment, a system for removing a key from a composite data structure including a radix tree and an auxiliary data structure includes a key remover that receives an instruction to remove a key from a composite data structure including a radix tree and an auxiliary data structure. The key includes a sequence of elements, the radix tree includes one or more containers storing a prefix, and the auxiliary data structure includes one or more entries storing a suffix. The system also includes a traverser that traverses the composite data structure to identify a set of containers and a set of entries storing chunks of the key. A traversal of the set of containers and the set of entries identifies the key. The system further includes a remover that identifies a leaf storing the last chunk of elements in the key and removes the leaf. The system also includes a combiner that determines whether a parent container of the leaf has only one child after the leaf is removed. When the parent container of the leaf is determined to have only one child after the leaf is removed, the combiner combines one or more sequences of elements based on the traversal of the set of containers and the set of entries. The system further includes a data structure builder that stores the combined one or more sequences of elements into an entry in the auxiliary data structure and stores a reference from the parent container to the entry.

According to another embodiment, a non-transitory machine-readable medium includes a plurality of machine-readable instructions that when executed by one or more processors are adapted to cause the one or more processors to perform a method including: receiving an instruction to remove a key from a composite data structure including a radix tree and an auxiliary data structure, the key including a sequence of elements, the radix tree including one or more containers storing a prefix, and the auxiliary data structure including one or more entries storing a suffix; traversing the composite data structure to identify a set of containers and a set of entries storing chunks of the key, where a traversal of the set of containers and the set of entries identifies the key; identifying a leaf storing the last chunk of elements in the key; removing the leaf; determining whether a parent container of the leaf has only one child after the leaf is removed; when the parent container of the leaf is determined to have only one child after the leaf is removed, combining one or more sequences of elements based on the traversal of the set of containers and the set of entries; storing the combined one or more sequences of elements in an entry in the auxiliary data structure; and storing a reference from the parent container to the entry.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
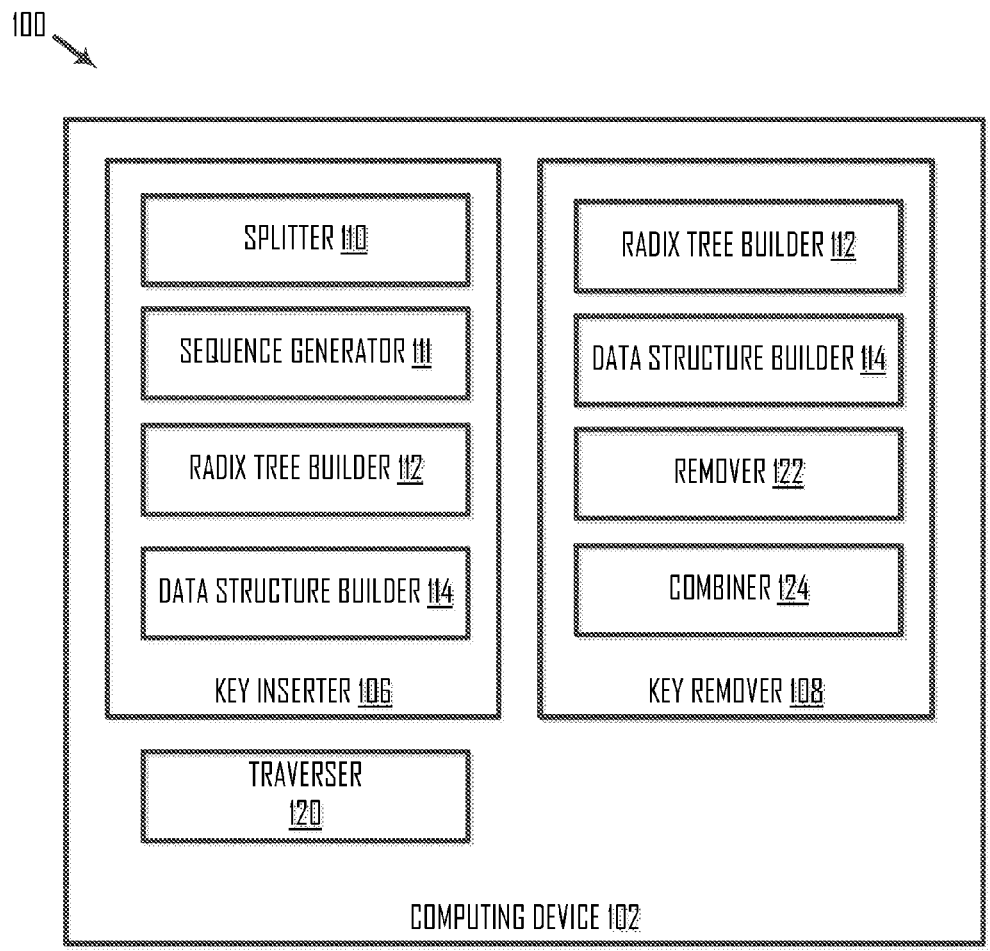
FIG. 1 is a block diagram illustrating a system for performing one or more operations on a composite data structure including a radix tree and an auxiliary data structure, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Example System Architecture
A. Create the Composite Data Structure
B. Insert a Key Having a Prefix Common to a Key Stored in the Composite Data Structure
 1. Generate a Sequence of Elements
 2. Split a Generated Sequence of Elements into a Chunk Including a Prefix and Suffix
 3. Store the Common Prefix Chunk ("AB") and/or Remainder Sequence ("C") of Key 202 ("ABC")
  a. Store Common Prefix Chunk ("AB")
  b. Store Remainder Sequence ("C")
 4. Store the Remainder Sequence ("DE") of Key 232 ("ABDE")
C. Insert a Key that Does Not Have a Prefix Common to a Key Stored in the Composite Data Structure
D. Remove a Key From the Composite Data Structure
II. Example Methods
III. Example Computing System It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

I. Example System Architecture

FIG. 1 is a block diagram 100 illustrating a system for performing one or more operations on a composite data structure including a radix tree and an auxiliary data structure, according to an embodiment. Diagram 100 includes a computing device 102 that includes a key inserter 106, key remover 108, and traverser 120. Computing device 102 may be a workstation, computer, server, game console, set-top box, kiosk, embedded system, mobile device (e.g., a mobile phone, personal digital assistant, tablet, and laptop), or other device having at least one processor and memory.

Each of key inserter 106, key remover 108, and traverser 120 is executable on computing device 102. Key inserter 106 inserts one or more keys into a composite data structure including a radix tree and an auxiliary data structure. Key inserter 106 includes a splitter 110, sequence generator 111, radix tree builder 112, and data structure builder 114. Key remover 108 removes one or more keys from the composite data structure, and includes radix tree builder 112, data structure builder 114, remover 122, and combiner 124. Traverser 120 traverses the composite data structure and may determine whether a particular key is stored in the composite data structure.

A key includes a sequence of elements. An element may be, for example, a symbol, character, letter, number, or bit. Other elements are within the scope of the disclosure. The key may map to a value that is referenced by the object (e.g., container or entry) storing the last element of the key. Alternatively, the key may map to a value that is stored in the object (e.g., container or entry) storing the last element of the key. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the composite data structure may be used to index words in a text document.

A. Create the Composite Data Structure

Figure 2A:
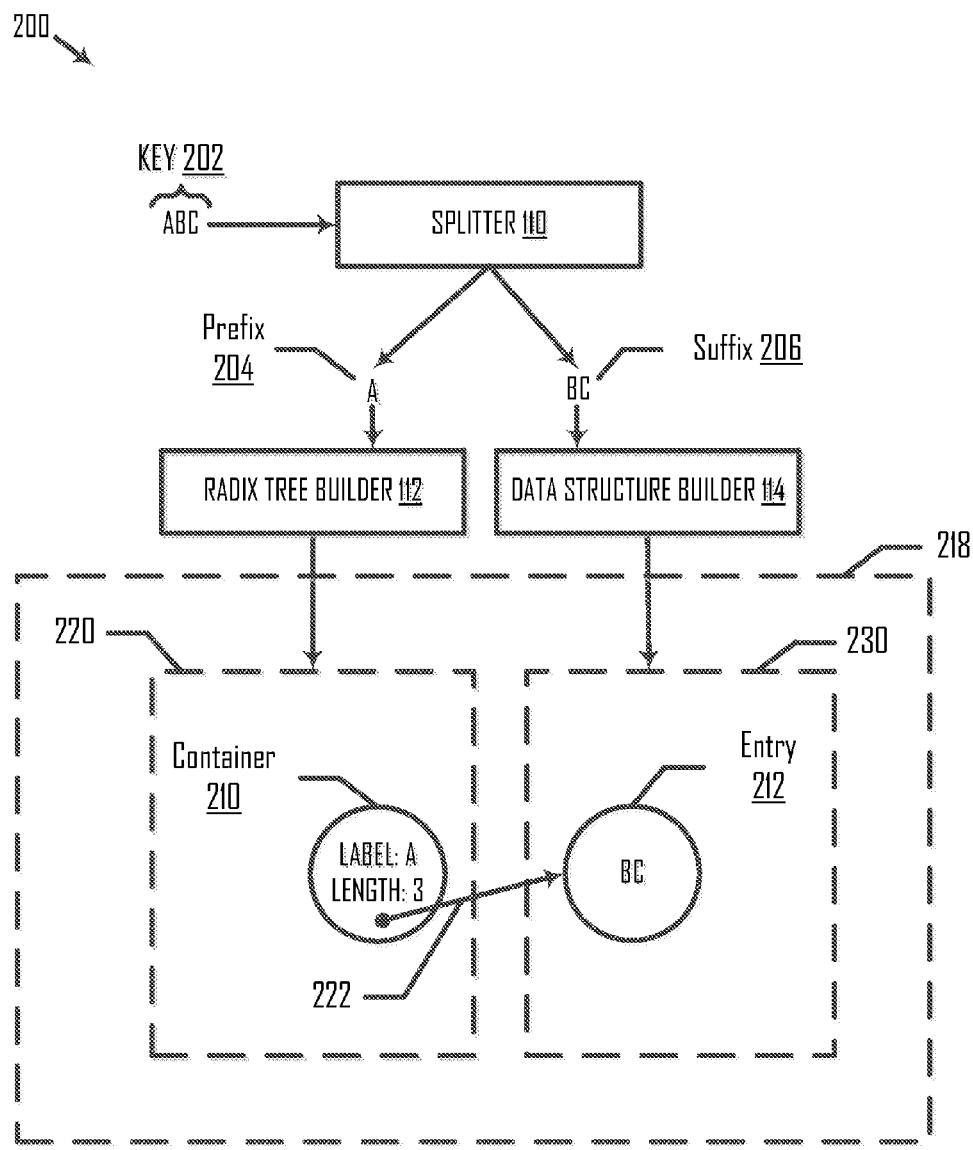
FIG. 2A-2B are diagrams of keys being inserted into the composite data structure, according to an embodiment.
Figure 2B:
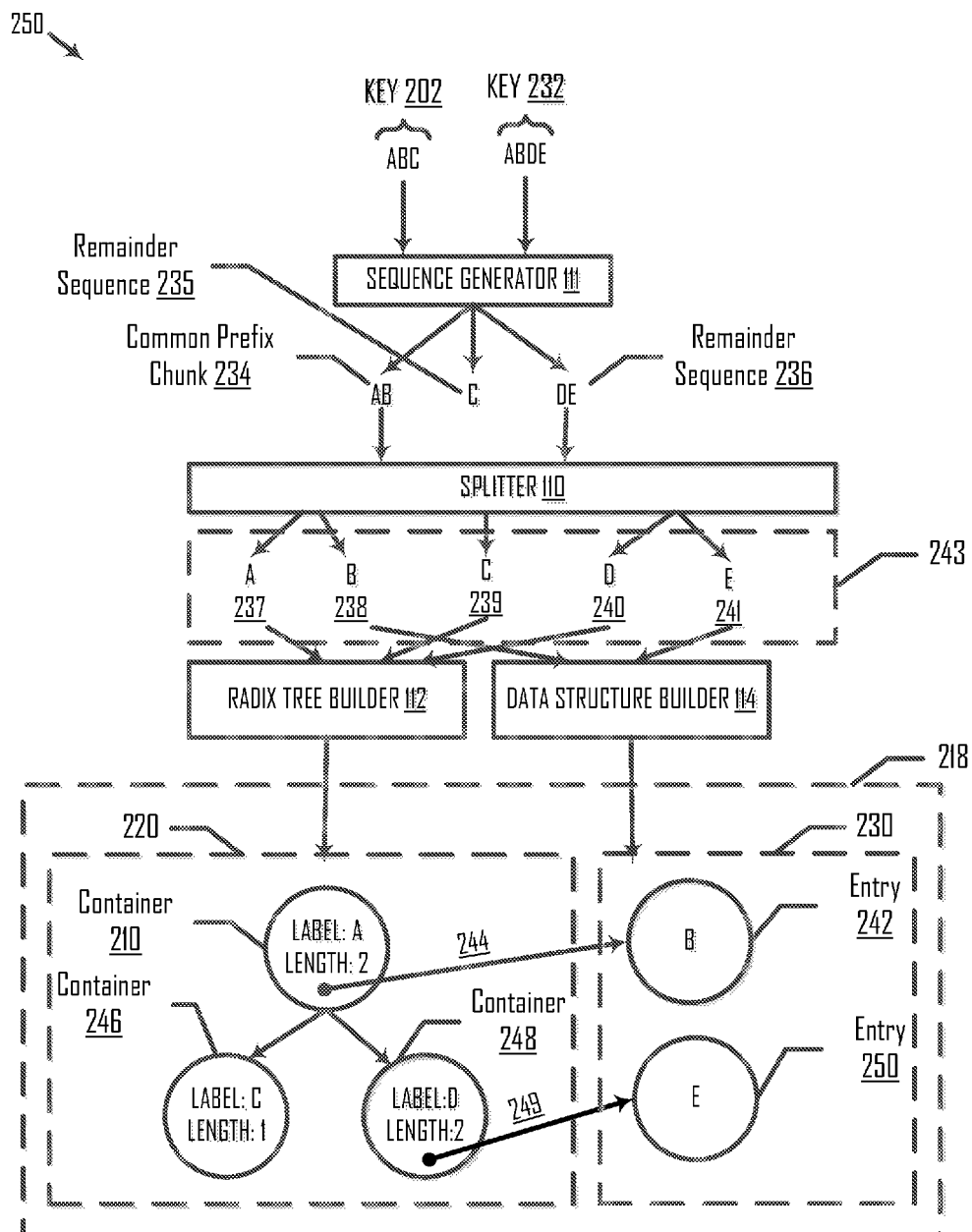

Key inserter 106 may receive an instruction to insert a key into a composite data structure. FIG. 2A-2B are diagrams 200, 250 of keys being inserted into a composite data structure including a radix tree and an auxiliary data structure, according to an embodiment. The radix tree includes one or more containers, and each container may have a label field that has as its value a prefix of a sequence of elements. A prefix may refer to the first X elements in the sequence of elements, where X is any whole number greater than zero. The auxiliary data structure stores one or more suffixes, which includes a remainder sequence of elements after the prefix. A container in the radix tree may reference an entry in the auxiliary data structure, which may be any data structure that is capable of storing a sequence of elements. The auxiliary data structure may be, for example, a table, array, binary tree, or other data structure. The container may also have a length field that has as its value a sum of a length of the sequence of elements in the container's label and a length of the suffix in an entry referenced by the container.

FIG. 2A is a block diagram 200 illustrating a key 202 being inserted into composite data structure 218 including a radix tree 220 and an auxiliary data structure 230, according to an embodiment. In FIG. 2A, key 202 includes a sequence of three elements "ABC", and the radix tree of the composite data structure has not yet been created. Splitter 110 obtains key 202 and splits it into a plurality of chunks based on a threshold. A chunk includes a sequence of elements. The plurality of chunks includes a prefix 204 and a suffix 206. Prefix 204 includes a beginning chunk of key 202, where the chunk has a number of elements up to the threshold. In an example, splitter 110 splits up key 202 such that a length of prefix 204 is smaller than the threshold. In another example, splitter 110 splits up key 202 such that the length of prefix 204 is equal to the threshold. When splitter 110 splits up key 202 into the plurality of chunks, the sequence of elements in prefix 204 and suffix 206 stays in its sequential order as the sequence of elements in key 202.

In the example illustrated in FIG. 2A, the threshold is one, and splitter 110 splits up key 202 into a prefix 204 having one element and suffix 206 having the remaining sequence of elements in key 202 after the prefix. Prefix 204 has a length equal to one and includes the sequence of elements "A", and suffix 206 has a length equal to two and includes the sequence of elements "BC". The last element in prefix 204 is adjacent to the first element in suffix 206 such that if suffix 206 were appended to prefix 204, the sequence of elements in key 202 could be identified.

In an embodiment, radix tree builder 112 creates one or more containers, stores a prefix of a sequence of elements in a container, and inserts the one or more containers into radix tree 220. In an example, radix tree builder 112 creates a container 210, stores prefix 204 in container 210, and inserts container 210 into radix tree 220. Container 210 may include a label field and a length field. Although a container is illustrated as including the length field, this is not intended to be limiting. For example, in another embodiment, a container does not include the length field. Radix tree builder 112 stores prefix 204 as the label of container 210 and three as the length of container 210. The length of container 210 is the sum of one (the length of the prefix stored in container 210, which is "A" and thus one) and two (the length of the suffix stored in entry 212, which is "BC" and thus two). A node has a one-to-one relationship with an incoming edge, and the container may be a node or an edge of the radix tree.

In an embodiment, data structure builder 114 stores one or more entries in auxiliary data structure 230, and an entry includes a suffix in a sequence of elements. Data structure builder 114 creates an entry 212 including suffix 206 and inserts entry 212 into auxiliary data structure 230. Entry 212 stores the next chunk after the prefix chunk stored in container 210. In an example, radix tree builder 112 identifies the entry storing the chunk of elements of key 202 after prefix 204 and stores a reference from the container storing prefix 204 to the identified entry. In such an example, data structure builder 114 may send radix tree builder 112 the memory address at which entry 212 is stored, and radix tree builder 112 may store a reference from container 210 to entry 212. In another example, data structure builder 114 identifies the container storing the prefix of key 202 preceding and adjacent to suffix 206 and stores a reference from the identified container to entry 212. In such an example, radix tree builder 112 may send data structure builder 114 the memory address at which container 210 is stored, and data structure builder 114 may store a reference from container 210 to entry 212.

Accordingly, if traverser 120 traverses composite data structure 218 to identify key 202, traverser 212 may traverse container 210, read container 210's label "A" and the length, and know that the length of the suffix stored in entry 212 is two. Traverser 120 may follow reference 222 to entry 212 and read "BC", the next two elements in key 202, and thus identify key 202, which is "ABC".

A leaf container has no children and may be associated with a value to which the key is mapped. In an embodiment, key inserter 106 identifies a value as being a value to which key 202 maps and associates the value 218 with key 202. In an example, key inserter 106 inserts the value into a container. In another example, key inserter 106 stores in a container a pointer to the value. Traverser 120 may then look in the leaf container to identify a value to which the key maps.

B. Insert a Key Having a Prefix Common to a Key Stored in the Composite Data Structure In FIG. 2A, composite data structure 218 stores key 202, which includes the sequence of elements "ABC". Key inserter 106 may receive an instruction to insert a key 232 into composite data structure 218. Sequence generator 111 may identify composite data structure 218 including radix tree 220 and auxiliary data structure 230 in FIG. 2A. Traverser 120 identifies a key stored in radix tree 220 having a prefix that is common to key 232. In an example, traverser 120 traverses radix tree 220 by traversing container 210 and reading container 210's label "A". Traverser 120 may follow reference 222 stored in container 210 to entry 212 and read the sequence of elements, "BC", stored in entry 212. Traverser 120 may then identify key 202, which has its sequence of elements stored in container 210 and entry 212, as having a prefix "A" that is common to key 232.

1. Generate a Sequence of Elements

FIG. 2B is a block diagram 250 illustrating a key 232 being inserted into composite data structure 218, according to an embodiment. Key 232 includes a sequence of elements "ABDE". In an embodiment, sequence generator 111 compares keys 202 and 232 and generates, based on the comparison, one or more sequences of elements. Splitter 110 may obtain a generated sequence of elements and split it into a prefix and zero of more suffixes. In an example splitter 110 obtains the one or more generated sequences of elements and outputs one or more sets of chunks. Each set of chunks may include a prefix and zero or more suffixes. Radix tree builder 112 may obtain the one or more prefixes of a chunk and insert each of the prefixes into radix tree 220. Data structure builder 114 may obtain one or more suffixes of a chunk and insert each of the suffixes into auxiliary data structure 230.

An advantage of an embodiment may be that radix tree is compact because a significant portion of the elements of a key are stored in the auxiliary data structure. Accordingly, if a large portion of the key lookups is expected to fail, storing the keys in composite data structure 218 as described in the disclosure may provide for faster lookups than a conventional radix tree because it may be unnecessary to go deep into radix tree 220 of composite data structure 218.

Sequence generator 111 may generate, based on the comparison of the keys, one or more sequences of elements. If the keys that are compared are the same, sequence generator 111 generates one sequence of elements, which is the common prefix chunk and is also the key. In such an example, sequence generator 111 does not generate a remainder sequence of elements because no sequence of elements is in any of the keys after the common prefix chunk.

In the example illustrated in FIG. 2B, sequence generator 111 generates, based on the comparison of keys 202 and 232, three sequences of elements. A first sequence of elements is a common prefix chunk 234, a second sequence of elements is a remainder sequence 235, and a third sequence of elements is a remainder sequence 236. Common prefix chunk 234 includes a prefix that is common in both keys 202 and 232. For example, common prefix chunk 234 is a chunk of elements including "AB", which is included as a prefix in both keys 202 and 232. Remainder sequence 235 is "C" and is the remaining sequence of elements after common prefix chunk 234 in key 202. Remainder sequence 236 is "DE" and is the remaining sequence of elements after common prefix chunk 234 in key 232.

2. Split a Generated Sequence of Elements into a Chunk Including a Prefix and Suffix In an embodiment, splitter 110 obtains the one or more sequences of elements generated by sequence generator 111 and splits the one or more generated sequences into a set of chunks based on the threshold. For each sequence of elements generated by sequence generator 111, splitter 110 may split the respective sequence of elements into a prefix and a suffix, where the length of the prefix does not exceed the threshold. Radix tree builder 112 may obtain each of the prefixes of the set of chunks and insert the one or more prefixes into radix tree 220. In an example, a prefix includes a common prefix chunk that is common to keys 202 and 232. In another example, a prefix includes a beginning chunk of one or more elements in a remainder sequence. A prefix of a remainder sequence generated by sequence generator 111 may be inserted as a child of the common prefix chunk in radix tree. Data structure builder 114 may obtain each of the suffixes of the set of chunks and insert the one or more suffixes into auxiliary data structure 230.

In keeping with the above example of the threshold being one, splitter 110 may obtain common prefix chunk 234, remainder sequence 235, and remainder sequence 236, and may determine a set of chunks 243 based on common prefix chunk 234, remainder sequence 235, and remainder sequence 236. In FIG. 2B, splitter 110 splits up common prefix chunk 234 ("AB") into a first set of chunks including a first prefix 237 and a first suffix 238. First prefix 237 is "A" and includes the first M elements of common prefix chunk 234 up to the threshold. In the example illustrated in FIG. 2B, M is equal to the threshold, and first prefix 237 has a length equal to one and is the first element in common prefix chunk 234. First suffix 238 is "B" and includes the remaining sequence of elements in common prefix chunk 234 after first prefix 237.

Similarly, splitter 110 splits up remainder sequence 235 ("C") into a second set of chunks including a second prefix 239 and no suffix. Second prefix 239 is "C" and includes the first N elements of remainder sequence 235 up to the threshold. In the example illustrated in FIG. 2B, N is equal to the threshold, and second prefix 239 has a length equal to one and is the first element in remainder sequence 235. The second set of chunks does not include a suffix because no elements remain in remainder sequence 235 after remainder sequence 235.

Similarly, splitter 110 splits up remainder sequence 236 ("DE") into a third set of chunks including a third prefix 240 and a second suffix 241. Third prefix 240 is "D" and includes the first P elements of remainder sequence 236 up to the threshold. In the example illustrated in FIG. 2B, P is equal to the threshold, and third prefix 240 has a length equal to one and is the first element in remainder sequence 236. Second suffix 241 is "E" and includes the remaining sequence of elements in remainder sequence 236 after third prefix 240. The variables M, N, and P may be any whole numbers that do not exceed the threshold. In the above example, M, N, and P are the same and equal to the threshold, but this is not intended to be limiting. In another example, M, N, and P may be the same as or smaller than the threshold. Additionally, M, N, and P may be different from each other.

Radix tree builder 112 may store the prefixes identified by splitter 110 into radix tree 220. For example, radix tree builder 112 obtains first prefix 237 ("A"), second prefix 239 ("C"), and third prefix 240 ("D") in set of chunks 243 and inserts the prefixes into radix tree 220. Data structure builder 114 may store the suffixes identified by splitter 110 into auxiliary data structure 230. For example, data structure builder 114 obtains first suffix 238 ("B") and second suffix 241 ("E") in set of chunks 243 and inserts the suffixes into auxiliary data structure 230. Radix tree builder 112 and data structure builder 114 may cooperate in storing the elements in composite data structure 218.

3. Store the Common Prefix Chunk ("AB") and/or Remainder Sequence ("C") of Key 202 ("ABC")

In FIG. 2A, key 202 is stored in container 210 and entry 212. One or more containers stored in radix tree 220 and/or one or more entries stored in auxiliary data structure 230 as they are illustrated in FIG. 2A may be rearranged to accommodate the insertion of key 232. In FIG. 2B, sequence generator 111 generates, based on keys 202 and 232, a sequence of elements including common prefix chunk 234 and remainder sequence 235. The combination of common prefix chunk 234 ("AB") and remainder sequence 235 ("C") results in key 202 ("ABC"), and radix tree builder 112 and data structure builder 114 may re-store key 202 in one or more different containers and/or one or more different entries as illustrated in FIG. 2A to accommodate the insertion of key 232.

a. Store Common Prefix Chunk ("AB")

As discussed, splitter 110 splits common prefix chunk 234 into first prefix 237 and first suffix 238, which are inserted into composite data structure 218. Radix tree builder 112 may desire to insert first prefix 237 ("A") into radix tree 220.

Traverser 120 may determine that first prefix 237 matches a prefix stored in container 210's label. Radix tree builder 112 may determine that first prefix 237 exactly matches container 210's label, and thus radix tree builder 112 may determine that it is unnecessary to create a new container for first prefix 237 in order to store it into radix tree 220.

Data structure builder 114 may create an entry 242 including first suffix 238 ("B") and insert entry 242 into auxiliary data structure 230. A reference may be stored in container 210 that references entry 242, which sequentially stores the chunk of elements in key 202 after the chunk stored in container 210. In an example, radix tree builder 112 identifies entry 242 as storing the suffix ("B") after first prefix 237 ("A") in common prefix chunk 234 ("AB"), and stores reference 244 from container 210 to entry 242. Radix tree builder 112 may also determine that entry 242 stores a suffix having a length of one. Accordingly, radix tree builder 112 may increment container 210's length by one and set container 210's length to two, which is the sum of the length of container 210's label (one) and the length of suffix 238 stored in entry 242 (one).

b. Store Remainder Sequence ("C")

Second prefix 239 ("C") includes a sequence of elements in key 202 that is after common prefix chunk 234 ("AB") in key 202. Splitter 110 splits remainder sequence 235 into second prefix 239, which is inserted into composite data structure 218. Radix tree builder 112 may desire to insert second prefix 239 into radix tree 220. After second prefix 239 is inserted into radix tree 220, the entire key 202 is stored in composite data structure 218.

To store second prefix 239 in radix tree 220, radix tree builder 112 may determine that second prefix 239 ("C") is a prefix identified by splitter 110 and is a sequence of elements in key 202 ("ABC") that is sequentially after first prefix 237 ("A"), which is stored in container 210. Radix tree builder 112 may create a new container 246 for second prefix 239, set the label of container 246 to second prefix 239 ("C"), and insert container 246 into radix tree 220. Radix tree builder 112 identifies container 210 as storing first prefix 237 and inserts container 246 as the child of container 210. Container 246 does not reference any entries in auxiliary data structure 230, and thus container 246's length is one, which is the length of container 246's label (one).

Accordingly, if traverser 120 traverses radix tree 220, traverser 120 may traverse container 210, read container 210's label "A" and the length, and know that container 210 references a suffix that includes one element (the difference between 2 (container 210's length) and 1 (the length of the suffix stored in entry 242)=1). Traverser 120 may follow reference 244 to entry 242 and read "B", the next element in key 202, and then traverse container 246, a child of container 210. Traverser 120 may read container 246's label ("C") and determine that container 246 does not store a reference to an entry stored in auxiliary data structure and also has no children. Thus, traverser 120 may identify key 202 as "ABC", the sequence of elements identified based on traversing container 210, entry 242, and container 246.

4. Store the Remainder Sequence ("DE") of Key 232 ("ABDE")

Key 232 includes common prefix chunk 234 ("AB") and remainder sequence 236 ("DE"). The insertion of common prefix chunk 234 has been described above. As discussed, splitter 110 splits remainder sequence 236 into third prefix 240 and second suffix 241, which are inserted into composite data structure 218. Radix tree builder 112 may desire to insert third prefix 240 ("D") into radix tree 220. To store third prefix 240 in radix tree 220, radix tree builder 112 may determine that third prefix 240 ("D") is a prefix identified by splitter 110 and is a sequence of elements in key 232 ("ABDE") that is sequentially after first prefix 237 ("A"), which is stored in container 210. Third prefix 240 ("D") includes a sequence of elements that is sequentially after common prefix chunk 234 ("AB") in key 232. Radix tree builder 112 identifies a container storing a chunk of elements preceding third prefix 240. Radix tree builder 112 may create a new container 248 for third prefix 240, set the label of container 248 to third prefix 240 ("D"), and insert container 248 into radix tree 220. Radix tree builder 112 identifies container 210 as storing first prefix 237 and inserts container 248 as the child of container 210.

Data structure builder 114 may create an entry 250 including second suffix 241 ("E") and insert entry 250 into auxiliary data structure 230. A reference may be stored in container 248 that references entry 250, which sequentially stores the chunk of elements in key 232 after the chunk stored in container 248. In an example, radix tree builder 112 identifies entry 250 as storing the suffix ("E") after third prefix 240 ("D") in remainder sequence 236, determines that third prefix 240 is stored in container 248, and stores a reference 249 from container 248 to entry 250. Radix tree builder 112 may also determine that entry 250 stores a suffix having a length of one. Accordingly, radix tree builder 112 may increment container 248's length by one set container 248's length to two, which is the sum of the length of container 248's label (one) and the length of suffix 241 stored in entry 250 (one).

Accordingly, if traverser 120 traverses radix tree 220, traverser 120 may traverse container 210, read container 210's label "A" and the length, and know that container 210 references a suffix that includes one element. Traverser 120 may follow reference 244 to entry 242 and read "B", the next element in key 232, and then traverse container 248, a child of container 210. Traverser 120 may read container 248's label ("D"), follow reference 249 from container 248 to entry 250, and read "E", the next element in key 232. Thus, traverser 120 may identify key 232 as "ABDE", the sequence of elements identified based on traversing a set of one or more containers and a set of one or more entries including container 210, entry 242, container 248, and entry 250.

Figure 3:
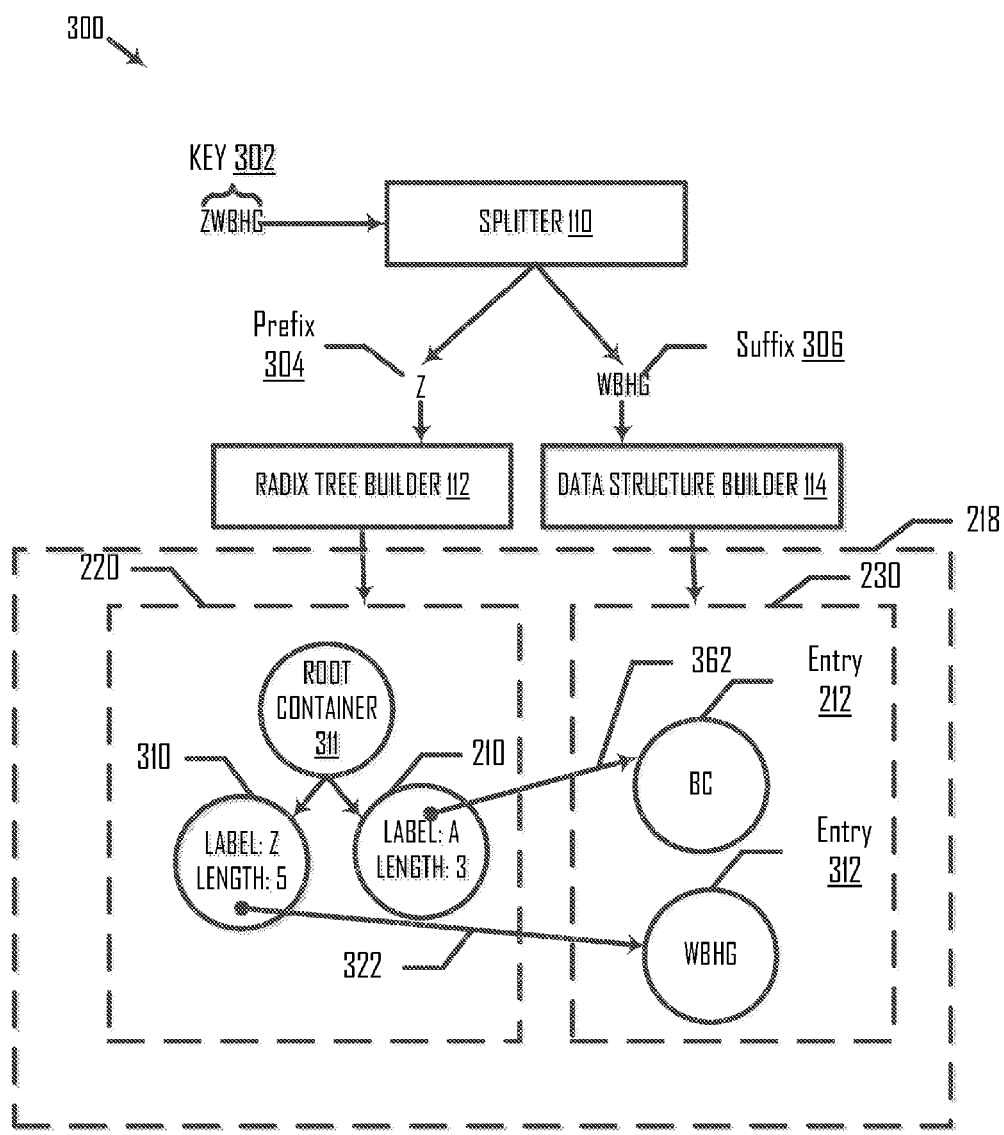
FIG. 3 illustrates a block diagram in which a key that does not have a prefix common to a key stored in the composite data structure is inserted into the composite data structure, according to an embodiment.

C. Insert a Key that Does Not Have a Prefix Common to a Key Stored in the Composite Data Structure In the example illustrated in FIG. 2B, key 232 has a prefix that is common to a key stored in composite data structure 218 in FIG. 2A. FIG. 3 illustrates a block diagram 300 in which a key that does not have a prefix common to a key stored in composite data structure 218 in FIG. 2A is inserted into composite data structure 218, according to an embodiment. Key inserter 106 may receive an instruction to insert a key 302 into composite data structure 218, where key 302 does not have a prefix that is common to key 202, which is stored in FIG. 2A.

Sequence generator 111 may identify composite data structure 218 including radix tree 220 and auxiliary data structure 230 in FIG. 2A. In FIG. 2A, composite data structure 218 stores key 202, which includes the sequence of elements "ABC". Traverser 120 traverses composite data structure 218 for a key having a prefix that is common to key 302 and determines that no key stored in composite data structure 218 has a prefix that is common to key 302.

Splitter 110 obtains key 302, which includes the sequence of elements "ZWBHG", and splits it into a plurality of chunks based on a threshold. The plurality of chunks includes a prefix 304 and a suffix 306. Prefix 304 includes a beginning chunk of key 302, where the chunk has a number of elements up to the threshold. In an example, splitter 110 splits up key 302 such that a length of prefix 304 is smaller than the threshold. In another example, splitter 110 splits up key 302 such that the length of prefix 304 is equal to the threshold. When splitter 110 splits up key 302 into the plurality of chunks, the sequence of elements in prefix 304 and suffix 306 stays in its sequential order as the sequence of elements in key 302.

In the example illustrated in FIG. 3, the threshold is one, and splitter 110 splits up key 302 into a prefix 304 having one element and suffix 306 having the remaining sequence of elements in key 302 after prefix 304. Prefix 304 has a length equal to one and includes the sequence of elements "Z", and suffix 306 has a length equal to four and includes the sequence of elements "WBHG". The last element in prefix 304 is adjacent to the first element in suffix 306 such that if suffix 306 were appended to prefix 304, the sequence of elements in key 302 could be identified.

Radix tree builder 112 may create a container 310, store prefix 304 in container 310, and insert container 310 into radix tree 220. Container 310 includes a label field and stores prefix 304 as the label of container 310. Data structure builder 114 may store one or more entries in auxiliary data structure 230, and an entry includes a suffix in a sequence of elements. Data structure builder 114 creates an entry 312 including suffix 306 and inserts entry 312 into auxiliary data structure 230. Entry 312 stores the next chunk after the prefix chunk stored in container 310. Radix tree builder 112 may identify the entry storing the chunk of elements of key 302 after prefix 304 and may store a reference from the container storing prefix 304 to the identified entry. In an example, data structure builder 114 sends radix tree builder 112 the memory address at which entry 312 is stored, and radix tree builder 112 stores a reference 322 from container 310 to entry 312. Container 310 also includes a length field, and stores five as the length of container 310. The length of container 310 is the sum of one (the length of the prefix stored in container 310, which is "Z" and thus one) and four (the length of the suffix stored in entry 312, which is "WBHG" and thus four).

Radix tree builder 112 may also create a root container 311 that has as its children containers 210 and 310. In an example, root container 311 has no label or length fields and stores references to containers 210 and 310. Accordingly, if traverser 120 traverses composite data structure 218 to identify key 302, traverser 120 may traverse root container 311 to container 310. Traverser 120 may read container 310's label "Z" and the length, and know that auxiliary data structure 230 stores a suffix having a length of four. Traverser 120 may follow reference 322 stored in container 310 to entry 312 and read "WBHG", the next four elements in key 302, and thus identify key 302 as including the sequence of elements "ZWBHG".

Additionally, if traverser 120 traverses composite data structure 218 to identify key 202, traverser 120 may traverse root 311 to container 210. Traverser 120 may read container 210's label "A" and the length, and know that the length of the suffix stored in entry 212 is two. Traverser 120 may follow reference 362 stored in container 210 to entry 212 and read "BC", the next two elements in key 202, and thus identify key 202, which is "ABC".

D. Remove a Key From the Composite Data Structure

Referring back to FIG. 1, key remover 108 includes radix tree builder 112, data structure builder 114, remover 122, and combiner 124. Remover 122 may receive an instruction to remove key 202 from a composite data structure. FIG. 2B is a block diagram 250 illustrating composite data structure 218 storing keys 202 and 232, according to an embodiment. Key 202 includes "ABC" and is stored in container 210 including "A", entry 242 including "B", and container 246 including "C". Key 232 includes "ABDE" and is stored in container 210 including "A", entry 242 including "B", container 248 including "D", and entry 250 including "E".

Traverser 120 traverses composite data structure 218 to identify the one or more containers stored in radix tree 220 and the one or more entries stored in auxiliary data structure 230 that store key 202, which is the key to be removed from composite data structure 218. In an example, traverser 120 identifies a set of containers and a set of entries storing chunks of key 202. In an example, traverser 120 identifies container 210 including "A", entry 242 including "B", and container 246 including "C" as storing key 202. Remover 122 may identify the leaf storing the last chunk of elements in key 202. The leaf may be a leaf container stored in radix tree 220 or a leaf entry stored in auxiliary data structure 230. Remover 122 may identify container 246 in FIG. 2B as the leaf storing the last chunk of elements in key 202 and may remove container 246 from radix tree 220 in FIG. 2B. In an example, if the leaf stores a value to which the key to be removed is mapped, remover 122 deletes the value. In another example, if the leaf references a value to which the key to be removed is mapped, remover 122 removes the reference. Remover 122 may identify the parent container of the removed leaf and determine whether the parent container has only other child in radix tree 220 after the leaf has been removed. In FIG. 2B, the parent container of container 246 is container 210.

Figure 4A:
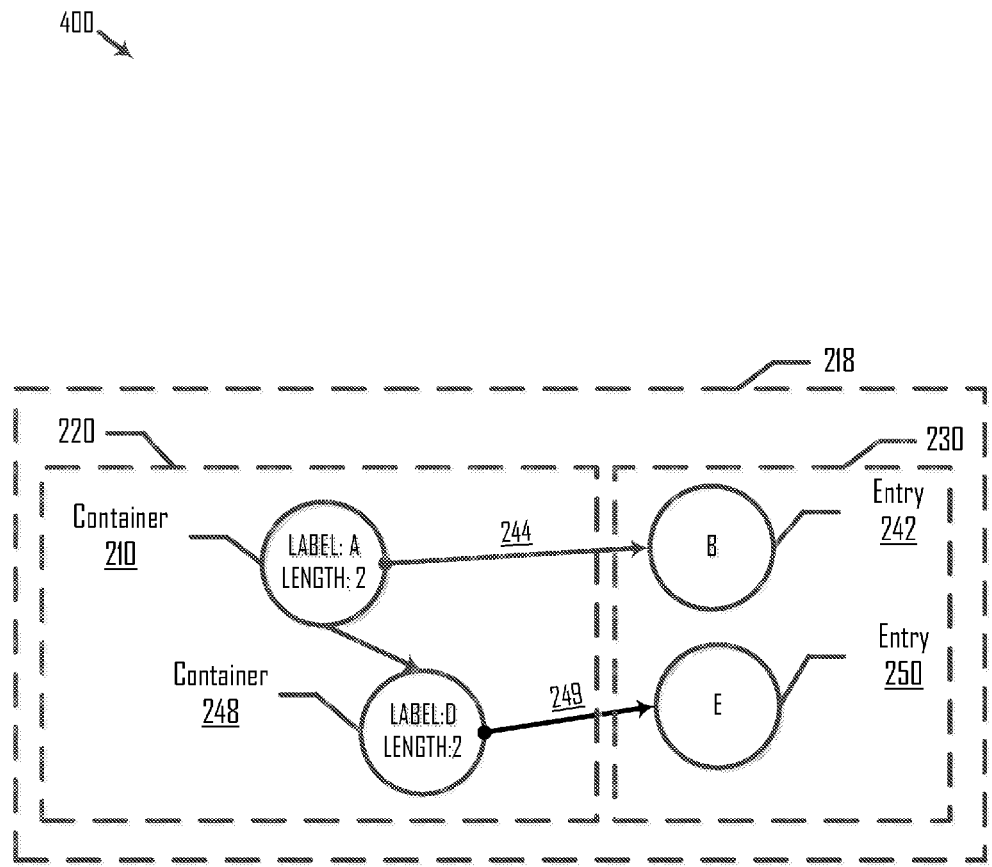
FIG. 4A-4B are diagrams of a key being removed from the composite data structure, according to an embodiment.
Figure 4B:
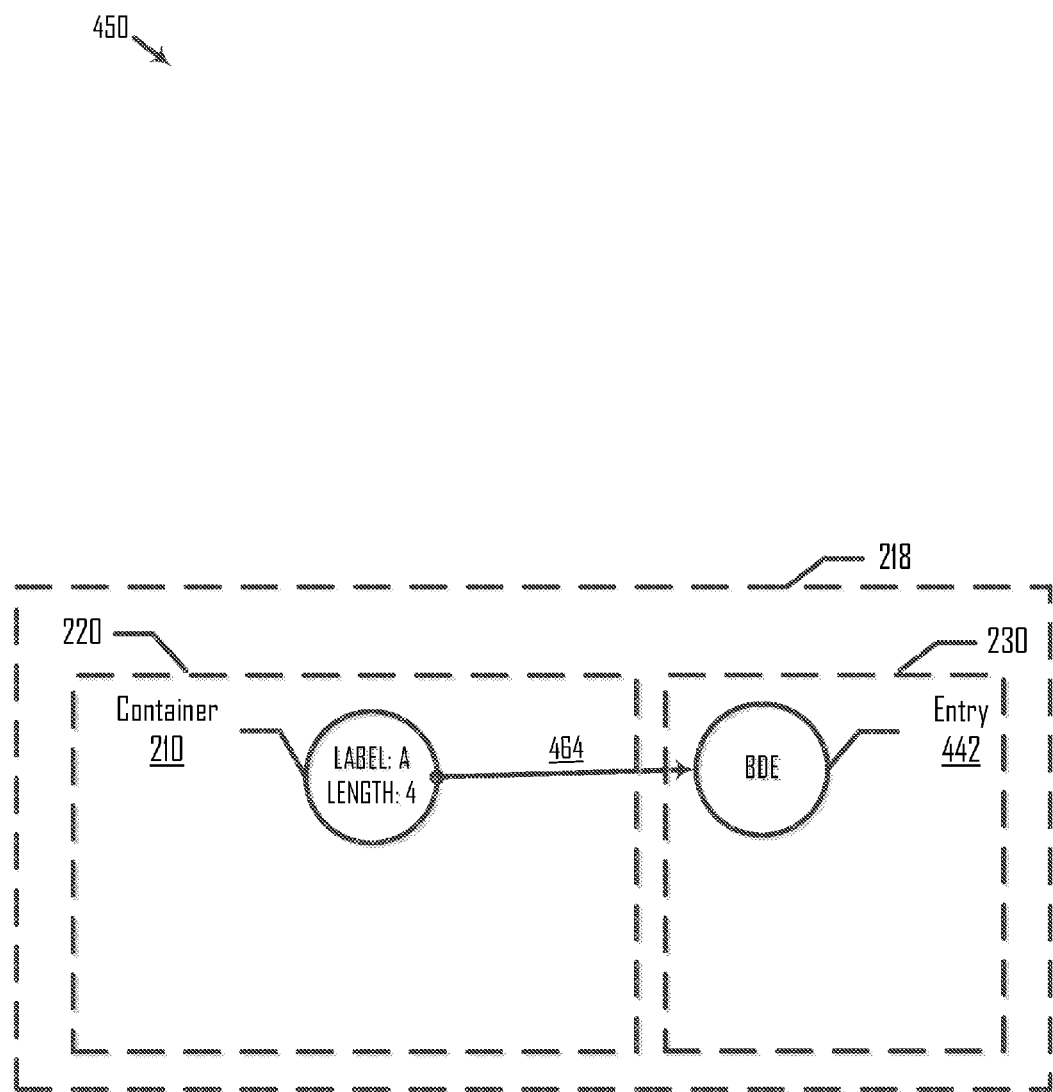

FIG. 4A-4B are diagrams 400, 450 of key 202 being removed from composite data structure 218, according to an embodiment. FIG. 4A is a diagram 400 of composite data structure 218 after container 246 has been removed in FIG. 2B, according to an embodiment. In FIG. 4A, container 246 has been removed from radix tree 220 in FIG. 2B, and radix tree 220 includes container 210 having a label "A" and 248 having a label "D", and auxiliary data structure 230 includes an entry 242 having a suffix "B" and an entry 250 having a suffix "E". Container 210, which is the parent container of the removed leaf (e.g., container 246), will have only one child after the leaf is removed. When the parent container has been determined to have only one child in radix tree 220 after the leaf is removed, traverser 120 may traverse the one or more entries stored in auxiliary data structure 230 and/or the one or more containers stored in radix tree 220 after the parent container. Traverser 120 may identify the sequence of elements stored in the traversed one or more entries and/or the one or more containers to determine a combined sequence of elements.

FIG. 4B is a diagram 450 of composite data structure 218 after key 202 has been has been removed, according to an embodiment. Combiner 124 may combine the chunks stored in the one or more traversed entries and/or the one or more traversed containers from container 210 storing the beginning chunk of a key to a container or entry storing the last chunk of the key in composite data structure 218. In an example, traverser 120 traverses a set of one or more containers and one or more entries to identify key 232. In such an example, traverser 120 traverses from container 210 (including "A") to entry 242 (including "B") to container 248 (including "D") to entry 250 (including "E"). Combiner 124 may combine the read chunks in the order traversed. For example, combiner 124 may combine the sequence of elements "B" (stored in entry 242), "D" (stored in container 248), and "E" (stored in entry 250) into a combination of one or more elements. Combiner 124 may store the combination of one or more elements into a single entry 442 that is stored in auxiliary data structure 230. As illustrated in FIG. 4B, entry 442 stores the sequence of elements "BDE", which is the sequential combination of elements that results from traversing the one or more entries and/or the one or more containers from container 210 to obtain a key.

Data structure builder 114 may create entry 442, store the combined sequence of elements in entry 442, and insert entry 442 into auxiliary data structure 230. A reference may be stored in container 210 that references entry 242, which sequentially stores the suffix of key 232. The suffix includes the chunk of elements in key 232 after the chunk stored in container 210. In an example, radix tree builder 112 identifies entry 442 as storing the suffix ("BDE") after the chunk stored in container 210, and stores reference 464 from container 210 to entry 442. Radix tree builder 112 may also determine that entry 442 stores a suffix having a length of three. Accordingly, radix tree builder 112 may update the length of container 210 to four, which is the sum of one (the length of the sequence of elements "A") and three (the length of the sequence of elements "BDE").

Radix tree builder 112 may determine whether the parent container has only one child container after the leaf is removed. If the parent container has only one child container after the leaf is removed, radix tree builder 112 may remove the child container. Radix tree builder 112 may also determine whether the child container references an entry in auxiliary data structure 230. When the child container is determined to reference an entry in auxiliary data structure 230, data structure builder 114 may remove the referenced entry. In the example illustrated in FIG. 4A, child container 248 is the only child of parent container 210 after container 246 has been removed and references entry 250. In such an example, radix tree builder 112 may remove container 248 and its reference to entry 250, and data structure builder 114 may remove entry 250. In an example, storing the combined one or more sequences of elements includes updating entry 442 to store the combined one or more sequences of elements. Data structure builder 114 may update the contents in entry 442 such that it stores the combined one or more sequences of elements.

In another example, radix tree builder 112 removes child container 248 that parent container 210 has and also removes any references from containers storing a chunk of key 202 to the auxiliary data structure. Data structure builder 114 may remove any entries referenced by containers storing a chunk of key 202 based on the traversal. Data structure builder 114 may create a new entry, store the combined one or more sequences of elements in the new entry, insert the new entry into auxiliary data structure 230, and store a reference from parent container 210 to the new entry in auxiliary data structure 230.

As discussed above and further emphasized here, FIGS. 1, 2A-2B, 3, and 4A-4B are merely examples, which should not unduly limit the scope of the claims. For example, it should be understood that one or more modules may be combined with another module. It should also be understood that a module may be separated into more than one module. Additionally, although the sequence of elements has been illustrated in FIGS. 2A-2B, 3, and 4A-4B as being letters, it should be understood that this not intended to be limiting. Other embodiments in which an element is different from a letter (e.g., bit or other symbol) is within the scope of the disclosure.

Figure 5:
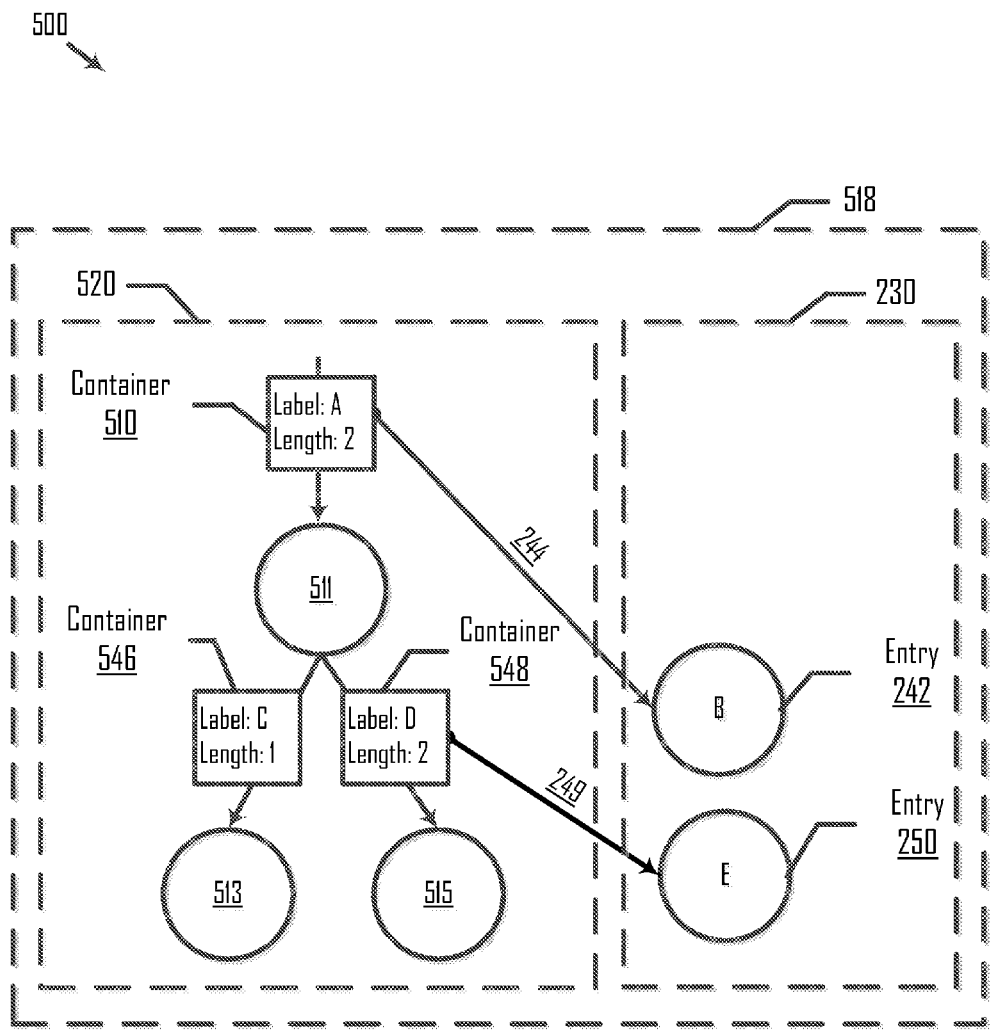
FIG. 5 is a block diagram illustrating containers as edges, according to an embodiment.

Further, in FIGS. 2A-2B, 3, and 4A-4B, a container is illustrated as being a node in the radix tree. This is not intended to be limiting and a container may also be an edge in the radix tree. FIG. 5 is a block diagram 500 illustrating containers as edges, according to an embodiment. Diagram 500 includes a composite data structure 518 including a radix tree 520 and auxiliary data structure 230. Composite data structure 518 corresponds to composite data structure 218 in FIG. 2B.

In FIG. 5, radix tree 520 includes a container 510 that is an incoming edge to node 511. Container 510 includes a label "A" and a length of 2 and also stores a reference to entry 242, which includes the chunk in key 202 after container 510's label. A container 546 is an incoming edge from node 511 to node 513. Container 546 includes a label "C" and a length of one. A container 548 is an incoming edge from node 511 to node 515. Container 548 includes a label "D" and a length of two, and also stores a reference to entry 250, which includes the chunk in key 232 after container 548's label.

II. Example Methods

Figure 6:
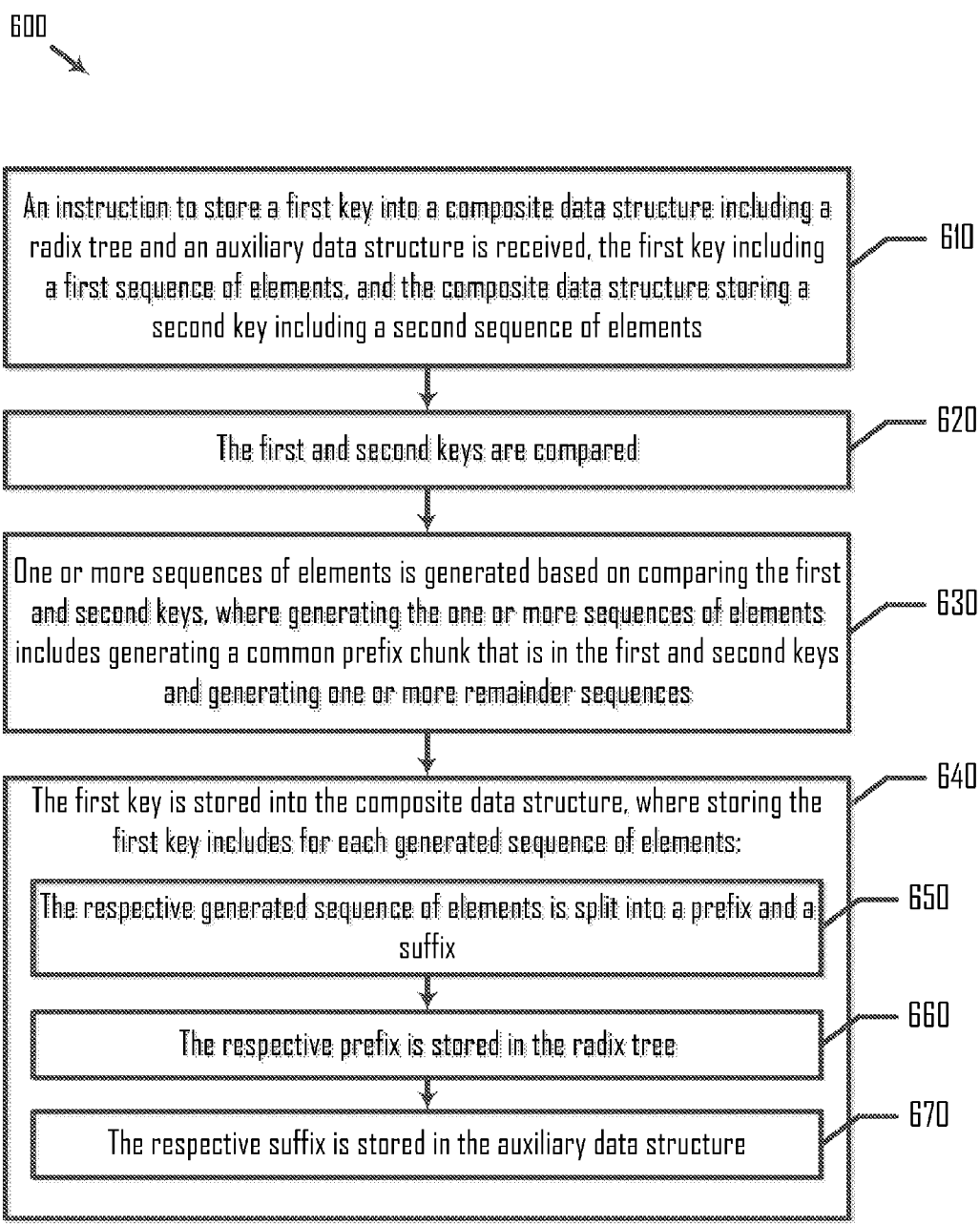
FIG. 6 is a flowchart illustrating a method of inserting a key into the composite data structure, according to an embodiment.

FIG. 6 is a flowchart illustrating a method 600 of inserting a key into a composite data structure, according to an embodiment. Method 600 is not meant to be limiting and may be used in other applications.

Method 600 includes actions 610-670. In an action 610, an instruction to store a first key into a composite data structure including a radix tree and an auxiliary data structure is received, the first key including a first sequence of elements, and the composite data structure storing a second key including a second sequence of elements. In an example, key inserter 106 receives an instruction to store key 232 into composite data structure 218 including radix tree 220 and auxiliary data structure 230, key 232 including a first sequence of elements, and composite data structure 218 storing a key 202 including a second sequence of elements.

In an action 620, the first and seconds keys are compared. In an example, sequence generator 111 compares keys 202 and 232. In an action 630, one or more sequences of elements is generated based on comparing the first and second keys, where generating the one or more sequences of elements includes generating a common prefix chunk that is in the first and second keys and generating one or more remainder sequences. In an example, sequence generator 111 generates, based on comparing second keys 202 and 232, one or more sequences of elements, where generating the one or more sequence of elements includes generating common prefix chunk 234 that is in keys 202 and 232 and generating remainder sequences 235 and 236.

In an action 640, the first key is stored into the composite data structure, where storing the first key includes for each generated sequence of elements, performing actions 650-670. In an action 650, the respective generated sequence of elements is split into a prefix and a suffix. In an action 660, the respective prefix is stored into the radix tree. In an action 670, the respective suffix is stored into the auxiliary data structure. In an example, radix tree builder 112 and data structure builder 114 store key 232 into composite data structure 218. In such an example, for each generated sequence of elements, splitter 110 may split the respective generated sequence of elements into a prefix and a suffix, radix tree builder 112 may store the respective prefix into radix tree 220, and data structure builder 114 may store the respective suffix into auxiliary data structure 230.

It is also understood that additional processes may be performed before, during, or after actions 610-670 discussed above. In an example, method 700 may follow action 640. It is also understood that one or more of the actions of method 600 described herein may be omitted, combined, or performed in a different sequence as desired.

Figure 7:
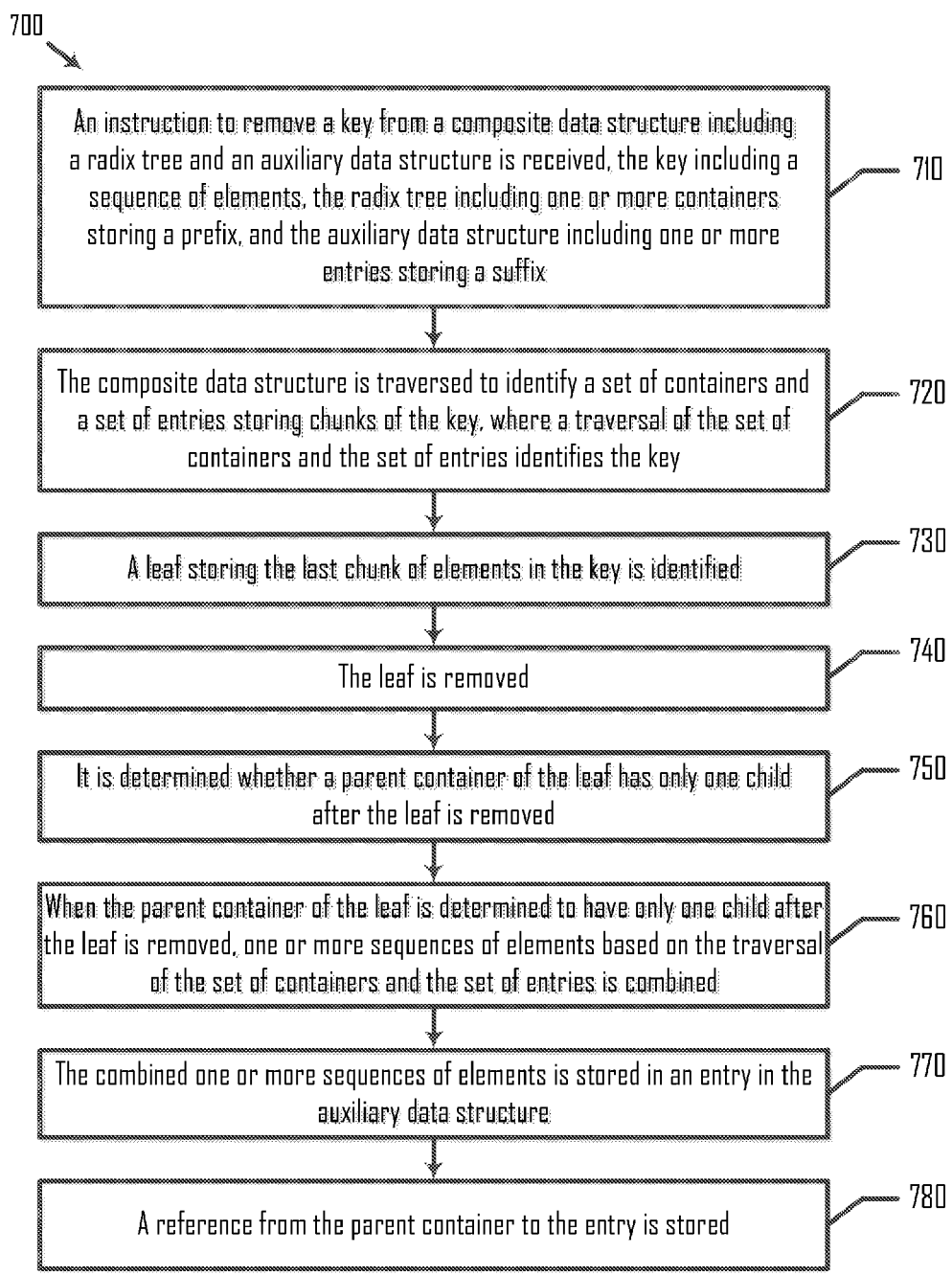
FIG. 7 is a flowchart illustrating a method of removing a key from the composite data structure, according to an embodiment.

FIG. 7 is a flowchart illustrating a method 700 of removing a key from a composite data structure, according to an embodiment. Method 700 is not meant to be limiting and may be used in other applications.

Method 700 includes actions 710-780. In an action 710, an instruction to remove a key from a composite data structure including a radix tree and an auxiliary data structure is received, the key including a sequence of elements, the radix tree including one or more containers storing a prefix, and the auxiliary data structure including one or more entries storing a suffix. In an example, key remover 108 receives an instruction to remove key 202 from composite data structure 218 including radix tree 220 and auxiliary data structure 230, key 202 including a sequence of elements "ABC", radix tree 220 including containers 210, 246, and 248 in FIG. 2B, and auxiliary data structure 230 including entries 242 and 250 in FIG. 2B.

In an action 720, the composite data structure is traversed to identify a set of containers and a set of entries storing chunks of the key, where a traversal of the set of containers and the set of entries identifies the key. In an example, traverser 120 traverses composite data structure 218 to identify a set of containers and a set of entries storing chunks of key 202, where a traversal of container 210, entry 242, and container 246 identifies key 202. In an action 730, a leaf storing the last chunk of elements in the key is identified. In an example, remover 122 identifies container 246 as a leaf storing the last chunk of elements in key 202.

In an action 740, the leaf is removed. In an example, remover 122 removes the leaf. In an action 750, it is determined whether a parent container of the leaf has only one child after the leaf is removed. In an example, combiner 124 determines whether parent container 310 of container 246 has only one child after container 246 is removed. In an action 760, when the parent container of the leaf is determined to have only one child after the leaf is removed, one or more sequences of elements based on the traversal of the set of containers and the set of entries is combined. In an example, when parent container 310 of container 246 is determined to have only one child after container 246 is removed, combiner 124 combines one or more sequences of elements based on the traversal of container 210, entry 242, and container 246. In an action 770, the combined one or more sequences of elements is stored in an entry in the auxiliary data structure. In an example, data structure builder 114 stores the combined one or more sequences of elements in an entry 442 in auxiliary data structure 230. In an action 780, a reference from the parent container to the entry is stored. In an action, radix tree builder 112 stores a reference 464 from parent container 210 to entry 442.

It is also understood that additional processes may be performed before, during, or after actions 710-780 discussed above. In an example, method 600 may follow action 780. It is also understood that one or more of the actions of method 700 described herein may be omitted, combined, or performed in a different sequence as desired.

III. Example Computing System

Figure 8:
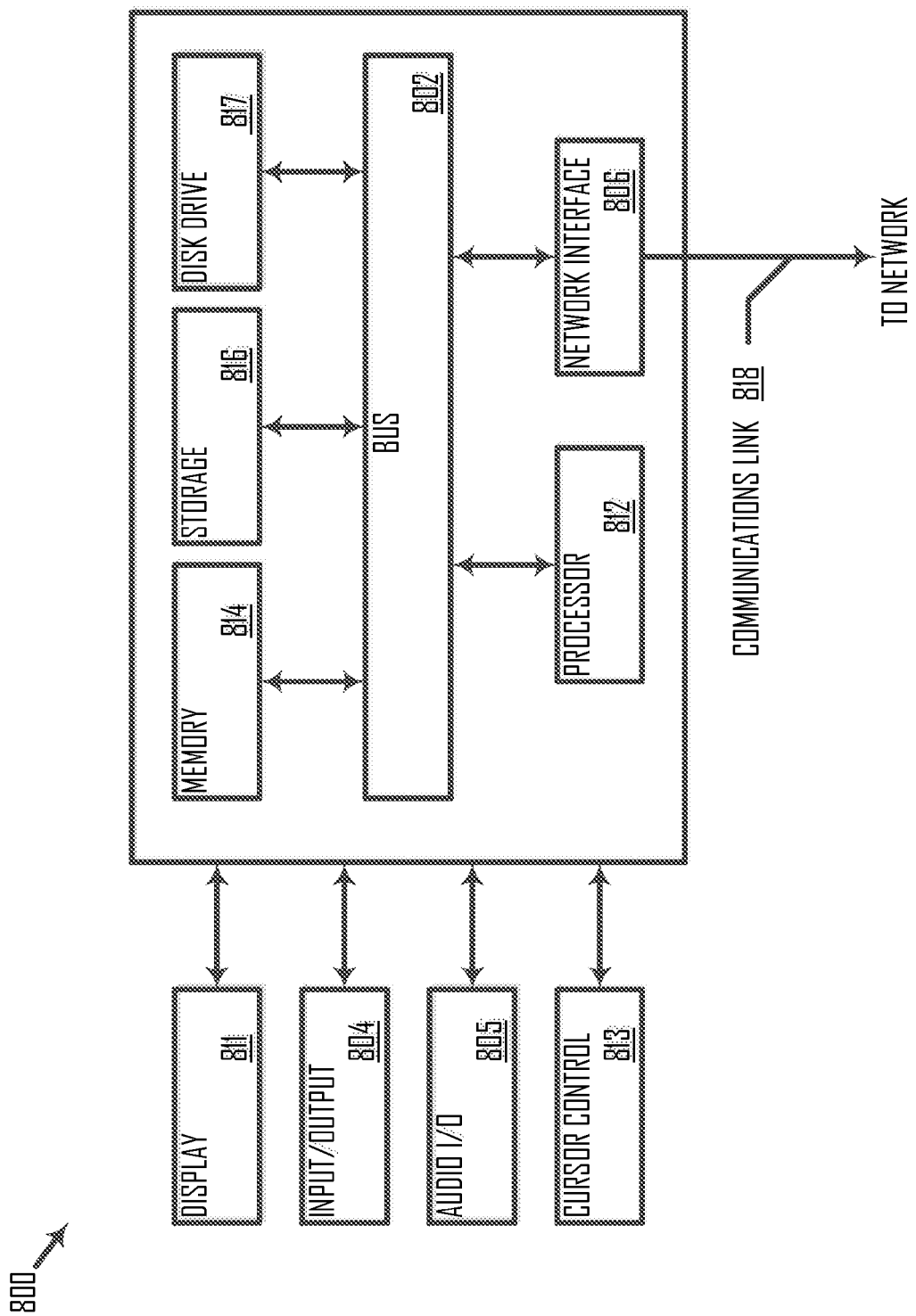
FIG. 8 is a block diagram of an electronic system suitable for implementing one or more embodiments of the present disclosure.

FIG. 8 is a block diagram of a computer system 800 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component such as a display 811, and an input control such as a cursor control 813 (such as a keyboard, keypad, mouse, etc.). An optional audio input/output component 805 may also be included to allow a user to use voice for inputting information by converting audio signals into information signals. Audio I/O component 805 may allow the user to hear audio. A transceiver or network interface 806 transmits and receives signals between computer system 800 and other devices via a communication link 818 to a network. In an embodiment, the transmission is wireless, although other transmission mediums and methods may also be suitable. A processor 812, which may be a microcontroller, digital signal processor (DSP), or other processing component, processes these various signals, such as for display on computer system 800 or transmission to other devices via communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer readable medium, which may refer to any medium that participates in providing instructions to processor 812 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 814, and transmission media includes coaxial cables, copper wire, and fiber optics, including wires that include bus 802. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of inserting a key into a composite data structure including a radix tree and an auxiliary data structure, comprising:
   receiving an instruction to store a first key into a composite data structure including a radix tree and an auxiliary data structure, the first key including a first sequence of elements, and the composite data structure storing a second key including a second sequence of elements;
   comparing the first and second keys;
   generating, based on the comparing, one or more sequences of elements, wherein the generating includes generating a common prefix chunk that is in the first and second keys and generating one or more remainder sequences; and
   storing the first key into the composite data structure, wherein the storing the first key includes for one or more generated sequences of elements:
      splitting the respective generated sequence of elements into a prefix and a suffix;
      storing the respective prefix into the radix tree; and
      storing the respective suffix into the auxiliary data structure.

2. The method of claim 1, wherein splitting a generated sequence of elements includes splitting the common prefix chunk into a first prefix and a first suffix, the first prefix being a beginning chunk of one or more elements in the common prefix chunk and the first suffix being a remainder sequence of elements in the common prefix chunk after the first prefix.

3. The method of claim 1, wherein the auxiliary data structure is a table.

4. The method of claim 1, further including:
   receiving a second instruction to remove the second key from the composite data structure, the radix tree including one or more containers storing a prefix, and the auxiliary data structure including one or more entries storing a suffix;
   traversing the composite data structure to identify a set of containers and a set of entries storing chunks of the second key, wherein a traversal of the set of containers and the set of entries identifies the second key;
   identifying a leaf storing the last chunk of elements in the second key;
   removing the leaf;
   determining whether a parent container of the leaf has only one child after the leaf is removed;
   when the parent container of the leaf is determined to have only one child after the leaf is removed, combining a sequence of elements based on the traversal of the set of containers and the set of entries;
   storing the combined one or more sequences of elements in an entry in the auxiliary data structure; and
   storing a reference from the parent container to the entry.

5. The method of claim 1, wherein a traversal from the radix tree to the auxiliary data structure identifies a chunk of a key inserted in the composite data structure.

6. The method of claim 1, wherein a chunk of the first key is stored in the radix tree and a chunk of the first key is stored in the auxiliary data structure.

7. The method of claim 1, wherein a traversal of the radix tree identifies a prefix of the first key and a traversal from the radix tree to the auxiliary data structure identifies a next element in the first key after the prefix of the first key.

8. The method of claim 2, wherein the generating a first remainder sequence includes generating a third sequence of elements, the third sequence of elements being in the first key after the common prefix chunk, and wherein the splitting the first remainder sequence includes splitting the first remainder sequence into a second prefix and a second suffix, the second prefix being a beginning chunk of one or more elements in the first remainder sequence and the second suffix being a remainder sequence of elements in the first remainder sequence after the second prefix.

9. The method of claim 8, wherein the radix tree includes one or more containers storing a prefix and the auxiliary data structure includes one or more entries storing a suffix, the method further including:
   locating, in the radix tree, a first container that stores the first prefix;
   locating, in the auxiliary data structure, a first entry that stores the first suffix;
   storing a first reference from the first container to the first entry;
   locating, in the radix tree, a second container that stores the second prefix;
   locating, in the auxiliary data structure, a second entry that stores the second suffix; and
   storing a second reference from the second container to the second entry.

10. The method of claim 9, wherein each container in the radix tree includes a length field that is a sum of the length of the prefix stored in the respective container and the length of the suffix stored in an entry that is referenced by the respective container.

11. The method of claim 9, further including:
creating the first container;
storing the first prefix in the first container;
inserting the first container into the radix tree;
creating the first entry;
storing the first suffix in the first entry; and
inserting the first entry into the auxiliary data structure.

12. The method of claim 9, further including:
creating the second container;
storing the second prefix in the second container;
identifying in the radix tree a given container that stores the prefix of the sequence of elements that precedes the second prefix;
inserting the second container into the radix tree as a child of the identified given container.

13. A system for inserting a key into a composite data structure including a radix tree and an auxiliary data structure, comprising:
a key inserter that receives an instruction to store a first key in a composite data structure including a radix tree and an auxiliary data structure, wherein the first key includes a first sequence of elements, and the composite data structure stores a second key including a second sequence of elements;
a sequence generator that compares the first and second keys and generates, based on the comparison, one or more sequences of elements, wherein the sequence generator generates a common prefix chunk that is in the first and second keys and generates one or more remainder sequences;
a splitter that splits one or more generated sequences of elements into a prefix and a suffix;
a radix tree builder that stores the one or more prefixes into the radix tree; and
a data structure builder that stores the one or more suffixes into the auxiliary data structure.

14. The system of claim 13, wherein the splitter splits the common prefix chunk into a first prefix and a first suffix, wherein the first prefix is a beginning chunk of one or more elements in the common prefix chunk and the first suffix is a remainder sequence of elements in the common prefix chunk after the first prefix.

15. The system of claim 13, wherein the key inserter receives a second instruction to remove the second key from the composite data structure, the radix tree includes one or more containers storing a prefix, and the auxiliary data structure includes one or more entries storing a suffix, the system further including:
a traverser that traverses the composite data structure to identify a set of containers and a set of entries storing chunks of the second key, wherein a traversal of the set of containers and the set of entries identifies the second key
a remover that identifies a leaf storing the last chunk of elements in the second key and removes the leaf; and
a combiner that determines whether a parent container of the leaf has only one child after the leaf is removed, wherein when the parent container of the leaf is determined to have only one child after the leaf is removed, the combiner combines a sequence of elements based on the traversal of the set of containers and the set of entries,
wherein the data structure builder stores the combined one or more sequences of elements in an entry in the auxiliary data structure and stores a reference from the parent container to the entry.

16. The system of claim 13, wherein the key inserter identifies a value to which the key maps and associates the value with a leaf container storing a chunk of the plurality of chunks.

17. The system of claim 14, wherein the sequence generator generates a first remainder sequence including a third sequence of elements, wherein the third sequence of elements is in the first key after the common prefix chunk, and wherein the splitter splits the first remainder sequence into a second prefix and a second suffix, wherein the second prefix is a beginning chunk of one or more elements in the first remainder sequence and the second suffix is a remainder sequence of elements in the first remainder sequence after the second prefix.

18. The system of claim 17, wherein the radix tree includes one or more containers storing a prefix and the auxiliary data structure includes one or more entries storing a suffix, wherein the radix tree builder locates a first container that stores the first prefix in the radix tree, locates a first entry that stores the first suffix in the auxiliary data structure, and stores a first reference from the first container to the first entry.

19. The system of claim 18, wherein the radix tree builder creates a second container that stores the second prefix, identifies the first container as storing the prefix of the sequence of elements that precedes the second prefix, and inserts the second container into the radix tree as a child of the first container.

20. A non-transitory machine-readable medium comprising a plurality of machine-readable instructions that when executed by one or more processors is adapted to cause the one or more processors to perform a method comprising:
receiving an instruction to store a first key in a composite data structure including a radix tree and an auxiliary data structure, the first key including a first sequence of elements, and the composite data structure storing a second key including a second sequence of elements;
comparing the first and second keys;
generating, based on the comparing, one or more sequences of elements, wherein the generating includes generating a common prefix chunk that is in the first and second keys and generating one or more remainder sequences; and
storing the first key into the composite data structure, wherein the storing the first key includes for one or more generated sequences of elements:
splitting the respective generated sequence of elements into a prefix and a suffix;
storing the respective prefix into the radix tree; and
storing the respective suffix into the auxiliary data structure.

21. A method of removing a key from a composite data structure including a radix tree and an auxiliary data structure, comprising:
receiving an instruction to remove a key from a composite data structure including a radix tree and an auxiliary data structure, the key including a sequence of elements, the radix tree including one or more containers storing a prefix, and the auxiliary data structure including one or more entries storing a suffix;
traversing the composite data structure to identify a set of containers and a set of entries storing chunks of the key, wherein a traversal of the set of containers and the set of entries identifies the key;
identifying a leaf storing the last chunk of elements in the key;
removing the leaf;
determining whether a parent container of the leaf has only one child after the leaf is removed;
when the parent container of the leaf is determined to have only one child after the leaf is removed, combining, based on the traversal, one or more sequences of elements stored in one or more containers and one or more entries;
storing the combined one or more sequences of elements in an entry in the auxiliary data structure; and
after removing the leaf, storing a reference from the parent container to the entry.

22. The method of claim 21, wherein the entry in the auxiliary data structure is referenced by the parent container, and wherein the storing the combined one or more sequences of elements includes updating the entry to store the combined one or more sequences of elements.

23. The method of claim 21, further including:
creating the entry;
storing the combined one or more sequences of elements in the entry;
inserting the entry into the auxiliary data structure; and
storing a reference from the parent container to the entry in the auxiliary data structure.

24. The method of claim 21, further including:
determining whether the parent container has only one child container after the leaf is removed;
removing the child container;
determining whether the child container references a second entry; and
when the child container is determined to reference the second entry, removing the second entry from the auxiliary data structure.

25. The method of claim 21, further including:
receiving a second instruction to store a second key in the composite data structure, the second key including a second sequence of elements, and the composite data structure storing a third key including a third sequence of elements;
comparing the second and third keys;
generating, based on the comparing, one or more sequences of elements, wherein the generating includes generating a common prefix chunk that is in the second and third keys and generating one or more remainder sequences; and
storing the second key into the composite data structure, wherein the storing the second key includes for each generated sequence of elements:
splitting the respective generated sequence of elements into a prefix and a suffix;
storing the respective prefix into the radix tree; and
storing the respective suffix into the auxiliary data structure.

26. The method of claim 21, further including:
determining whether the leaf maps to a value to which the key is mapped; and
when the leaf is determined to map to the value to which the key is mapped, deleting the value.

27. The method of claim 21, wherein the combined one or more sequences of elements is a chunk of a previous key that was inserted in the composite data structure, and the parent container stores a prefix of the previous key.

28. A system for removing a key from a composite data structure including a radix tree and an auxiliary data structure, comprising:
a key remover that receives an instruction to remove a key from a composite data structure including a radix tree and an auxiliary data structure, the key including a sequence of elements, the radix tree including one or more containers storing a prefix, and the auxiliary data structure including one or more entries storing a suffix;
a traverser that traverses the composite data structure to identify a set of containers and a set of entries storing chunks of the key, wherein a traversal of the set of containers and the set of entries identifies the key;
a remover that identifies a leaf storing the last chunk of elements in the key and removes the leaf; and
a combiner that determines whether a parent container of the leaf has only one child after the leaf is removed, wherein when the parent container of the leaf is determined to have only one child after the leaf is removed, the combiner combines, based on the traversal, one or more sequences of elements stored in one or more containers and one or more entries,
wherein the data structure builder stores the combined one or more sequences of elements in an entry in the auxiliary data structure and wherein after the leaf is removed, the data structure builder stores a reference from the parent container to the entry.

29. The system of claim 28, wherein the container is a node or an edge.

30. The system of claim 28, wherein the entry in the auxiliary data structure is referenced by the parent container, and wherein the data structure builder updates the entry to store the combined one or more sequences of elements.

31. The system of claim 28, wherein the remover determines whether the parent container has only one child container after the leaf is removed and when the parent container is determined to have only one child container after the leaf is removed, the remover the child container, wherein the remover determines whether the child container references a second entry, and when the child container is determined to reference the second entry, the remover removes the second entry from the auxiliary data structure.

32. The system of claim 28, further including:
a key inserter that receives a second instruction to store a second key in the composite data structure, wherein the second key includes a second sequence of elements, and the composite data structure stores a third key including a third sequence of elements;
a sequence generator that compares the second and third keys and generating, based on the comparison, one or more sequences of elements, wherein the sequence generator generates a common prefix chunk that is in the second and third keys and generates one or more remainder sequences;
a splitter that splits each generated sequence of elements into a prefix and a suffix;
a radix tree builder that stores the one or more prefixes into the radix tree; and
a data structure builder that stores the one or more suffixes into the auxiliary data structure.

33. A non-transitory machine-readable medium comprising a plurality of machine-readable instructions that when executed by one or more processors is adapted to cause the one or more processors to perform a method comprising:
receiving an instruction to remove a key from a composite data structure including a radix tree and an auxiliary data structure, the key including a sequence of elements, the radix tree including one or more containers storing a prefix, and the auxiliary data structure including one or more entries storing a suffix;

traversing the composite data structure to identify a set of containers and a set of entries storing chunks of the key, wherein a traversal of the set of containers and the set of entries identifies the key;

identifying a leaf storing the last chunk of elements in the key;

removing the leaf;

determining whether a parent container of the leaf has only one child after the leaf is removed;

when the parent container of the leaf is determined to have only one child after the leaf is removed, combining, based on the traversal, one or more sequences of elements stored in one or more containers and one or more entries;

storing the combined one or more sequences of elements in an entry in the auxiliary data structure; and after removing the leaf, storing a reference from the parent container to the entry.

* * * * *